United States Patent [19]
Lehto

[11] Patent Number: 5,853,516
[45] Date of Patent: Dec. 29, 1998

[54] METHOD AND APPARATUS FOR LAMINATING GLASS SHEETS

[75] Inventor: Esko Lehto, Kangasala, Finland

[73] Assignee: Tamglass Engineering Oy, Tampere, Finland

[21] Appl. No.: 543,780

[22] Filed: Oct. 16, 1995

[30] Foreign Application Priority Data

Oct. 20, 1994 [FI] Finland ................................ 944920

[51] Int. Cl.$^6$ .......................... B32B 31/20; B32B 31/26
[52] U.S. Cl. .................. 156/102; 156/272.2; 156/275.7
[58] Field of Search .............. 156/106, 99, 104, 156/272.2, 273.3, 273.5, 309.9, 102, 275.7

[56] References Cited

U.S. PATENT DOCUMENTS

| | | | |
|---|---|---|---|
| 3,982,984 | 9/1976 | Baldridge | 156/106 |
| 4,367,106 | 1/1983 | Valimont | 156/106 |
| 5,069,734 | 12/1991 | Kavanagh et al. | 156/106 |

FOREIGN PATENT DOCUMENTS

| | | |
|---|---|---|
| 2638449 | 4/1990 | France . |
| 9101880 | 2/1991 | WIPO . |
| 9222427 | 12/1992 | WIPO . |

*Primary Examiner*—Michael W. Ball
*Assistant Examiner*—Michael A Tolin
*Attorney, Agent, or Firm*—Royston, Rayzor, Vickery, Novak & Druce

[57] ABSTRACT

The invention relates to a method and apparatus for laminating glass sheets. A sandwich structure to be laminated is preheated with radiation heat to a temperature of about 30° C.–45° C. This is followed by a first pressing operation between a pair of rolls (1). Next, the sandwich structure is heated by two-sided hot-air blasting (4, 5) for raising the temperature of glass and film to a temperature range of 60° C.–85° C. This is followed by a pressing operation between a second pair of press rolls.

4 Claims, 2 Drawing Sheets

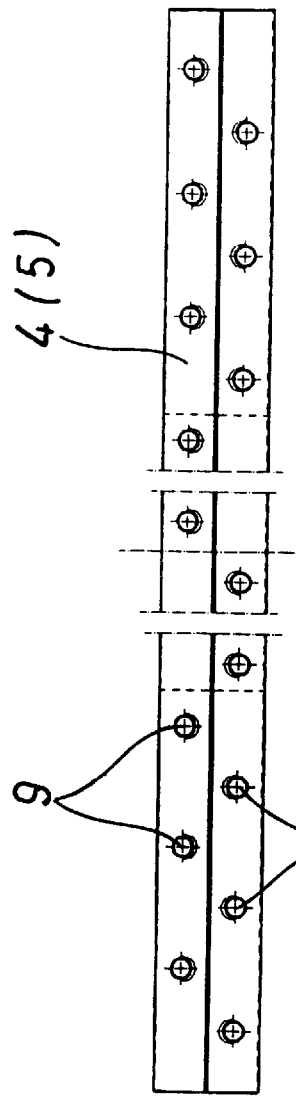
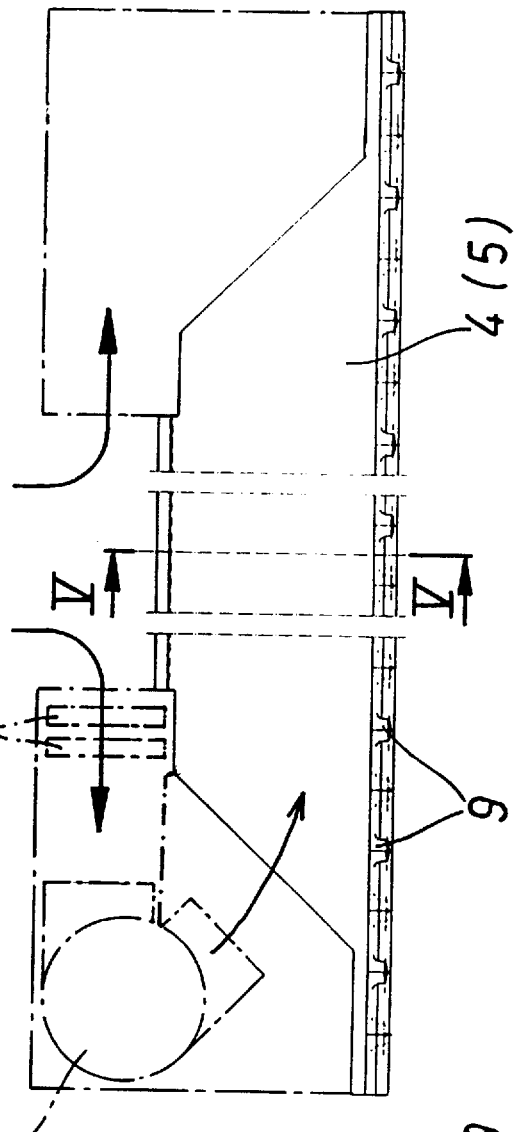
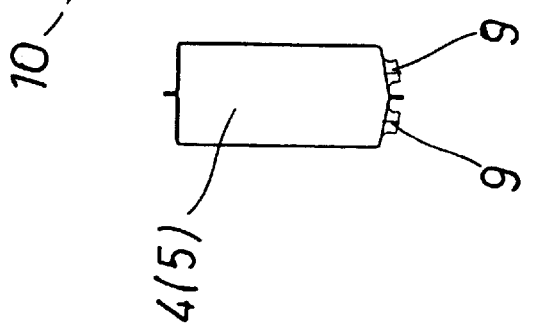

METHOD AND APPARATUS FOR LAMINATING GLASS SHEETS

The present invention relates to a method for laminating glass sheets, in which method a plastic film is laid between glass sheets and a resulting sandwich structure is carried through a first pair of press rolls, followed by heating the sandwich element such that the glass and film have a temperature which rises to the temperature range of 60° C.–85° C. and carrying the heated sandwich structure through a second pair of press rolls.

The invention relates also to an apparatus for laminating glass sheets, said apparatus comprising a first pair of press rolls, a second pair of press rolls, a horizontal conveyor between the pairs of press rolls as well as heating elements for heating a sandwich structure consisting of glass sheets and a plastic film.

A problem is to achieve a complete contact between the surfaces of glass and plastic. In the prior art methods there are voids remaining between the surfaces with certain shrinkage occurring after the first press nip.

Another problem is to achieve a heat distribution as rapidly and evenly as possible throughout the thickness of the sandwich structure.

An object of the invention is to provide a multi-sequence heating method and apparatus, including a first sequence for creating a contact as complete as possible between glass and plastic whereby, in a second sequence, the heating can be effected by using effective surface convection having an air temperature which is relatively low. Such a sequential arrangement contributes to the improvement of both quality and production capacity.

A method of the invention is characterized in that upstream of the first pressing the sandwich structure is preheated with radiation heat and between the pressing operations the sandwich structure is heated by means of two-sided hot-air blasting.

In order to bring the first-sequence radiation heating to heat as effectively and evenly as possible the interior of the sandwich structure, the radiating surface used in radiation heating has a temperature which is within the range of 1600° C.–1900° C., preferably about 1800° C., the radiation including mostly radiation that has a wavelength within the range of appr. 1,5 µm–1,3 µm, preferably about 1,4 µm.

In the second heating sequence, however, the convection air must have its maximum temperature limited to a relatively low temperature in view of applying an effective convection without excessively raising the sandwich structure surface temperature. In this respect, it is preferred that the air blasted to both surfaces of the sandwich structure have a temperature of about 80° C.–120° C.

The characterizing features for an apparatus of the invention are set forth in claim 5.

The invention will now be described in more detail with reference made to the accompanying drawings, in which FIG. 1 shows the essential components of an apparatus of the invention in a side view;

FIG. 3 shows a nozzle block for a convection heating element included in the apparatus, viewed from the side facing the orifices;

FIG. 4 shows the nozzle block of FIG. 3 in a side view and

FIG. 5 shows the nozzle block in a section along the line V—V in FIG. 4.

Figure 1:
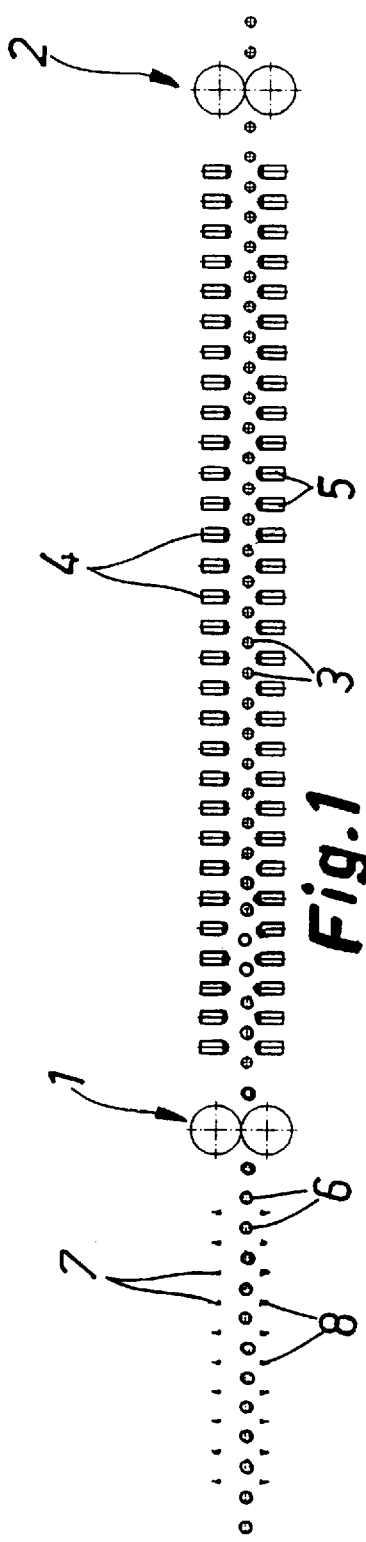
Figure 2:
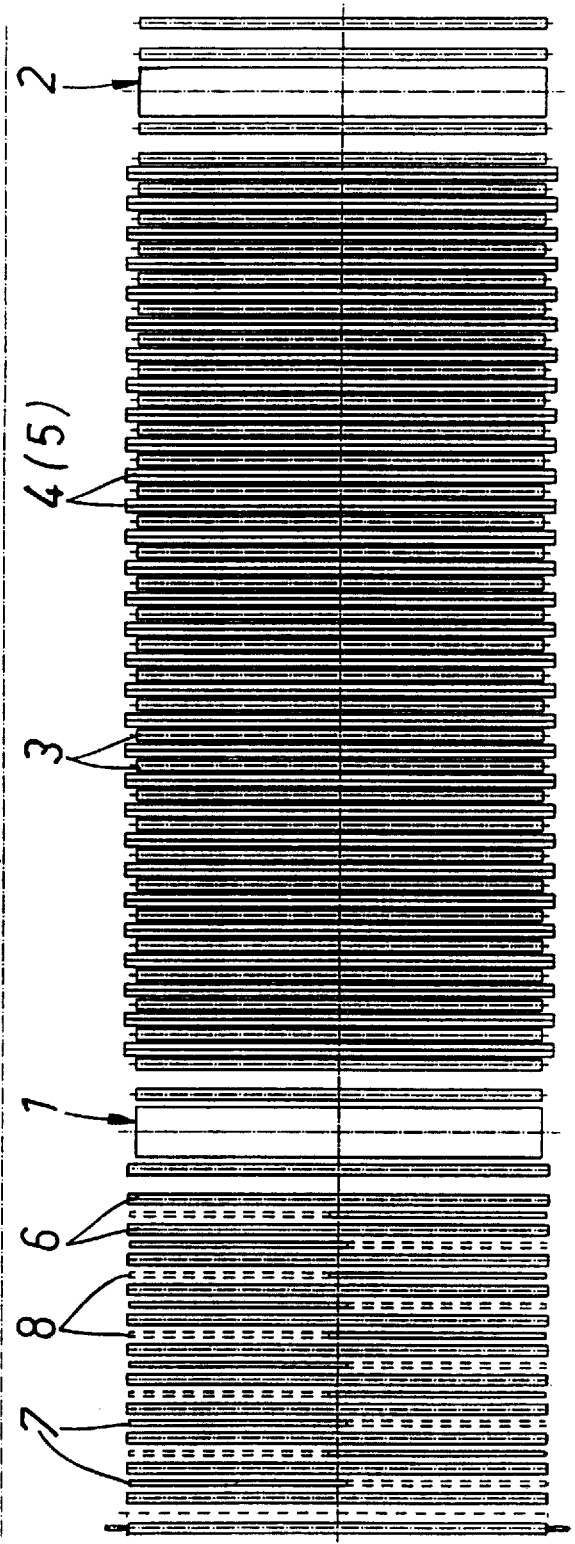
FIG. 2 shows the apparatus of FIG. 1 in a plan view.

In a laminating room, which is not shown, the glass sheets to be laminated are placed on top of each other with a plastic film therebetween. The layers are loosely on top of each other and arrive at substantially room temperature at a conveyor consisting of rollers 6. Above and below the conveyor are radiation heating elements, especially incandescent filament resistances 7, 8, for preheating the sandwich structure to be laminated. A radiating surface included in the filament resistances have a temperature which is within the range of about 1600° C.–1900° C., preferably about 1800° C., the radiation including mostly radiation that has a wavelength within the range of appr. 1,5 µm–1,3 µm, preferably about 1,4 µm. Short-wave heat radiation produced by a high temperature has been found to penetrate most effectively within the interior of a sandwich structure, the preheating being as even as possible. The sandwich structure is preheated with radiation heat to a temperature of about 30° C.–45° C., whereby the film softens sufficiently for achieving between press rolls a contact as complete as possible between the glass and film surfaces, said contact remaining intact even after the pressing. Without the preheating, however, the film would shrink or contract sufficiently to re-form voids between the surfaces after the pressing.

From between the press rolls 3 the sandwich structure emerges onto a conveyor consisting of rollers 3 and provided thereabove and -below with nozzle blocks 4 and 5 for blasting warm air to the opposite surfaces of the sandwich structure. The more detailed configuration of nozzle blocks 4 and 5 is shown in FIGS. 3–5. Each block includes two rows of orifices 9 in quite a densely staggered array and the direction thereof deviates slightly outwards from the vertical plane. The air of a heating section is continuously circulated through the nozzle blocks 4 and 5. Fans 10 are used for sucking the air of a heating chamber through a heating radiator 11 consisting e.g. of electrical resistances and for forcing the air into the blocks 4, 5 to be discharged therefrom as jets emerging from the nozzles 9 against the glass surface. The air to be blasted has a temperature of about 80° C.–120° C., depending e.g. on the thicknesses of the sandwich structure and the laminae used therein. What is essential is that the maximum temperature of air is sufficiently low in order not to raise the sandwich structure surface temperature too much. An objective is to bring the glass and films of the sandwich structure to a temperature of about 60° C.–85° C., which is required for bringing the films to an adhesive state. However, the films must not soften too much in order to maintain the film thickness as close to constant as possible during the subsequent pressing operation and to prevent the film from extruding out of the edges of the sandwich structure. The heated sandwich structure is carried through press rolls 2 for producing a sufficient adhesion between glasses and films. Such laminated glass is still conventionally treated in an autoclave.

I claim:

1. A method for laminating glass sheets, in which method a plastic film is laid between glass sheets and a resulting sandwich structure is carried through a first pair of press rolls (1), followed by heating the snadwich element such that the glass and film have a temperature which rises to the temperature range of 60° C.–85° C. and carrying the heated sandwich structure through a second pair of press rolls (2), characterized in that upstream of the first pressing the snadwich structure is preheated with radiation heat (7, 8) and between the pressing operations the sandwich structure is heated by means of two-sided hot-air blasting (4, 5).

2. A method as set forth in claim 1, characterized in that the radiating surface used in radiation heating has a temperature within the range of about 1600° C.–1900° C., preferably about 1800° C., the radiation mostly including radiation having a wavelength within the range of about 1,5 μm–1,3 μm, preferably about 1,4 μm.

3. A method as set forth in claim 1, characterized in that the sandwich structure to be laminated is preheated with radiation heat to a temperature of about 30° C.–45° C.

4. A method as set forth in claim 1, characterized in that the air blasted to both surfaces of the sandwich structure has a temperature of about 80° C.–120° C.

* * * * *